United States Patent
Tsuji

(10) Patent No.: US 12,359,908 B2
(45) Date of Patent: Jul. 15, 2025

(54) MEMBER DISTINGUISH APPARATUS, MEMBER DISTINGUISH METHOD, AND COMPUTER-READABLE MEDIUM

(71) Applicant: NEC Corporation, Tokyo (JP)

(72) Inventor: Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 830 days.

(21) Appl. No.: 17/610,748

(22) PCT Filed: May 24, 2019

(86) PCT No.: PCT/JP2019/020598
§ 371 (c)(1),
(2) Date: Nov. 12, 2021

(87) PCT Pub. No.: WO2020/240609
PCT Pub. Date: Dec. 3, 2020

(65) Prior Publication Data
US 2022/0236050 A1    Jul. 28, 2022

(51) Int. Cl.
*G01B 11/24*    (2006.01)
(52) U.S. Cl.
CPC .................... *G01B 11/24* (2013.01)
(58) Field of Classification Search
CPC ......... G06V 20/64; G01B 11/24; G01B 11/00
See application file for complete search history.

(56) References Cited

U.S. PATENT DOCUMENTS

| | | | |
|---|---|---|---|
| 2016/0163067 A1* | 6/2016 | Williams | G06V 20/64 |
| | | | 382/154 |
| 2018/0144496 A1 | 5/2018 | Posner et al. | |
| 2018/0241923 A1 | 8/2018 | Lu et al. | |

FOREIGN PATENT DOCUMENTS

| | | | |
|---|---|---|---|
| JP | H09189526 | * | 7/1997 |
| JP | 2005-331285 A | | 12/2005 |
| JP | 2010-014693 A | | 1/2010 |
| JP | 2014-153336 A | | 8/2014 |
| JP | 2016-206026 A | | 12/2016 |

OTHER PUBLICATIONS

International Search Report for PCT Application No. PCT/JP2019/020598, mailed on Aug. 27, 2019.

* cited by examiner

*Primary Examiner* — Lam S Nguyen

(57) ABSTRACT

A member distinguishing apparatus includes a three-dimensional sensor that irradiates a member with a beam and acquire first point group data based on at least amplitude information of light, a point group data analysis unit that extracts second point group data which is point group data of the member from the first point group data, and obtains, with respect to the second point group data, a distribution of the point group data in a vertical direction which is a longitudinal direction of the member, a lateral direction orthogonal to an irradiation direction of the beam when an area of a surface of the member irradiated by the three-dimensional sensor becomes the largest and also orthogonal to the vertical direction, and a depth direction orthogonal to the longitudinal direction and the lateral direction, and a member distinguishing unit that distinguishes a type of the member from the distribution.

10 Claims, 24 Drawing Sheets

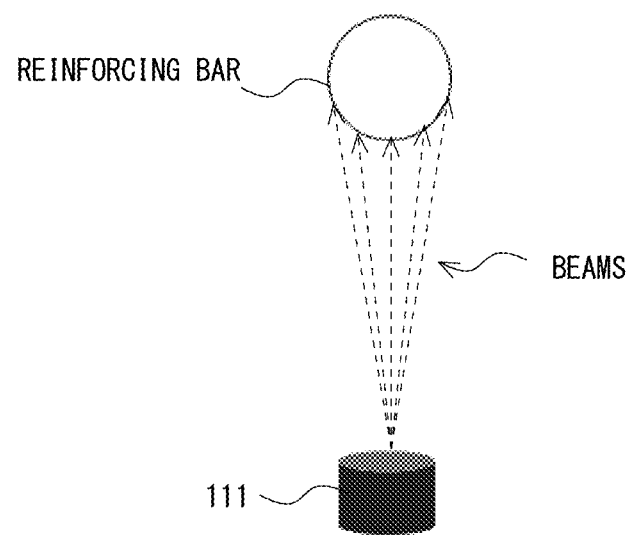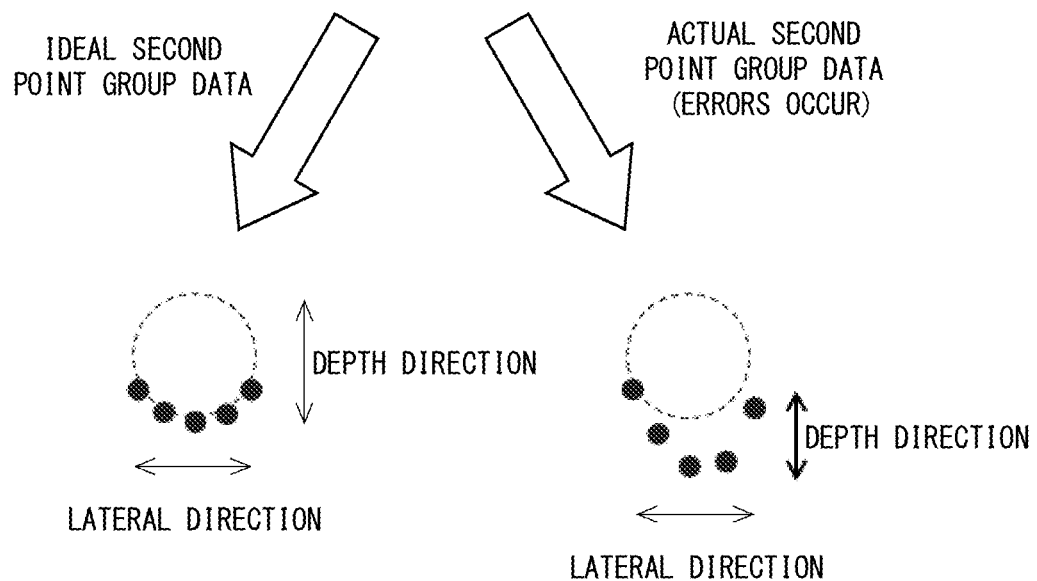
Fig. 17

| DISTANCE FROM THREE-DIMENSIONAL SENSOR [m] | TYPE OF REINFORCING BAR (STANDARD NAME) | | | |
|---|---|---|---|---|
| | D10 | D13 | D16 | D19 |
| 1 | $v < 1.8\text{E}{-}06$ | $1.8\text{E}{-}06 \leq v$ $< 5.8\text{E}{-}06$ | $5.8\text{E}{-}06 \leq v$ $< 1.0\text{E}{-}05$ | $1.0\text{E}{-}05 \leq v$ |
| ⋮ | ⋮ | ⋮ | ⋮ | ⋮ |
| 5 | $3.2\text{E}{-}05 \leq v$ $< 3.5\text{E}{-}05$ | $3.7\text{E}{-}05 \leq v$ $< 4.3\text{E}{-}05$ | $4.6\text{E}{-}05 \leq v$ $< 5.1\text{E}{-}05$ | $5.9\text{E}{-}05 \leq v$ $< 6.5\text{E}{-}05$ |
| ⋮ | ⋮ | ⋮ | ⋮ | ⋮ |
| 10 | $5.4\text{E}{-}05 \leq v$ $< 6.8\text{E}{-}06$ | $6.4\text{E}{-}05 \leq v$ $< 8.3\text{E}{-}06$ | $8.2\text{E}{-}05 \leq v$ $< 1.03\text{E}{-}04$ | $8.2\text{E}{-}05 \leq v$ $< 1.04\text{E}{-}04$ |

※UNIT OF VALUES INDICATING RANGE OF VARIANCE v IN TABLE IS [m²]

Fig. 19

MEMBER DISTINGUISH APPARATUS, MEMBER DISTINGUISH METHOD, AND COMPUTER-READABLE MEDIUM

This application is a National Stage Entry of PCT/JP2019/020598 filed on May 24, 2019, the contents of all of which are incorporated herein by reference, in their entirety.

TECHNICAL FIELD

The present disclosure relates to a member distinguishing apparatus, a member distinguishing method, and a computer readable medium.

BACKGROUND ART

When a reinforced concrete structure is built, it is necessary to carry out a bar arrangement inspection to inspect positions and thicknesses (diameters) of reinforcing bars placed in the structure. Patent Literature 1 discloses a technique for measuring reinforcing bars from a plurality of places in the structure using a three-dimensional laser scanner, integrating measurement data, and comparing the integrated measurement data with reference data to determine a reinforcing bar arrangement state.

CITATION LIST

Patent Literature

Patent Literature 1: Japanese Unexamined Patent Application Publication No. 2010-014693

SUMMARY OF INVENTION

Technical Problem

In the technique described in Patent Literature 1, it is necessary to measure reinforcing bars from a plurality of places in the structure, which causes a problem that much time and effort are needed to do this. Further, although the diameters of the reinforcing bars are standardized at intervals of, for example, 2 to 3 mm, in the technique of Patent Literature 1, it is necessary to perform measurement accurate enough to enable a distinction to be made between such diameters of the reinforcing bars (i.e., a degree of distinction precision on the order of millimeters). Thus, there is a problem that the cost of the measuring instrument is increased.

An object of the present disclosure is to provide a member distinguishing apparatus capable of automatically and accurately distinguishing a type of a member to be inspected by performing simple measurement on a member to be inspected at a low cost using a three-dimensional sensor.

Solution to Problem

A first example aspect of the present disclosure is a member distinguishing apparatus including: a three-dimensional sensor configured to irradiate one or more members to be inspected with a beam and acquire first point group data based on at least amplitude information of light; a point group data analysis unit configured to extract second point group data from the first point group data, the second point group data being point group data of the member to be inspected, and obtain, with respect to the second point group data, a distribution of the point group data in a vertical direction, the vertical direction being a longitudinal direction of the member to be inspected, a lateral direction orthogonal to an irradiation direction of the beam when an area of a surface of the member to be inspected irradiated by the three-dimensional sensor becomes the largest and also orthogonal to the vertical direction, and a depth direction orthogonal to the longitudinal direction and the lateral direction; and a member distinguishing unit configured to distinguish a type of the member to be inspected from the distribution.

A second example aspect of the present disclosure is a member distinguishing method including: a first step of, performed by a three-dimensional sensor capable of acquiring point group data based on at least amplitude information of light, irradiating one or more members to be inspected with a beam and acquiring first point group data; a second step of extracting second point group data from the first point group data, the second point group data being point group data of the member to be inspected, and obtaining, with respect to the second point group data, a distribution of the point group data in a vertical direction, the vertical direction being a longitudinal direction of the member to be inspected, a lateral direction orthogonal to an irradiation direction of the beam when an area of a surface of the member to be inspected irradiated by the three-dimensional sensor becomes the largest and also orthogonal to the vertical direction, and a depth direction orthogonal to the longitudinal direction and the lateral direction; and a third step of distinguishing a type of the member to be inspected from the distribution.

A third example aspect of the present disclosure is non-transitory computer readable medium storing a program for causing a computer to execute: a first step of, performed by a three-dimensional sensor capable of acquiring point group data based on at least amplitude information of light, irradiating one or more members to be inspected with a beam and acquiring first point group data; a second step of extracting second point group data from the first point group data, the second point group data being point group data of the member to be inspected, and obtaining, with respect to the second point group data, a distribution of the point group data in a vertical direction, the vertical direction being a longitudinal direction of the member to be inspected, a lateral direction orthogonal to an irradiation direction of the beam when an area of a surface of the member to be inspected irradiated by the three-dimensional sensor becomes the largest and also orthogonal to the vertical direction, and a depth direction orthogonal to the longitudinal direction and the lateral direction; and a third step of distinguishing a type of the member to be inspected from the distribution.

Advantageous Effects of Invention

According to the present disclosure, it is possible to provide a member distinguishing apparatus capable of automatically and accurately distinguishing a type of a member to be inspected by performing simple measurement on a member to be inspected at a low cost using a three-dimensional sensor.

BRIEF DESCRIPTION OF DRAWINGS

FIG. 17 is a schematic view for explaining an error occurring in the depth direction when the three-dimensional sensor is a ToF type sensor which is a mainstream 3D-LiDAR sensor for automated driving;

FIG. 19 is a schematic view showing an example of reference information held in an information holding unit;

DESCRIPTION OF EMBODIMENTS

Figure 1:
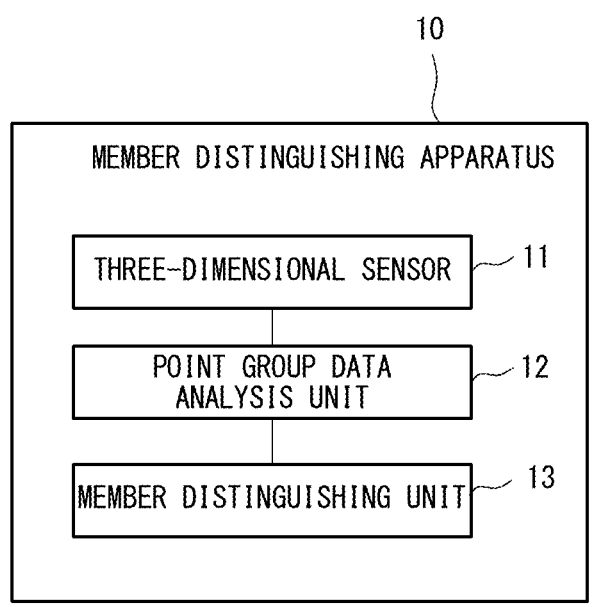
FIG. 1 is a block diagram showing a configuration of a member distinguishing apparatus according to a first example embodiment.

Example embodiments of the present disclosure will be described below with reference to the drawings. For clarity of description, the following descriptions and drawings have been omitted and simplified as appropriate. In each of the drawings, the same elements are denoted by the same reference numerals, and repeated descriptions are omitted as necessary.

First Example Embodiment

A first example embodiment will be described below.

FIG. 1 is a block diagram showing a configuration of a member distinguishing apparatus 10 according to a first example embodiment. As shown in FIG. 1, the member distinguishing apparatus 10 includes a three-dimensional sensor 11, a point group data analysis unit 12, and a member distinguishing unit 13.

The three-dimensional sensor 11 can measure a distance based on at least amplitude information of light, and irradiates one or more members to be inspected with a beam to acquire first point group data. The point group data analysis unit 12 extracts second point group data, which is point group data of the member to be inspected, from the first point group data. The point group data analysis unit 12 obtains, for the second point group data, a distribution of the point group data in each of a vertical direction, which is the longitudinal direction of the member to be inspected, a lateral direction orthogonal to an irradiation direction of the beam when an area of a surface of the member to be inspected irradiated by the three-dimensional sensor becomes the largest and also orthogonal to the vertical direction, and a depth direction which is orthogonal to the vertical direction and the lateral direction. The member distinguishing unit 13 distinguishes a type of the member to be inspected from the distributions.

In this way, the type of the member to be inspected can be automatically and accurately distinguished by simple measurement of the member to be inspected at a low cost using the three-dimensional sensor 11.

Second Example Embodiment

A second example embodiment will be described below.

Figure 2:
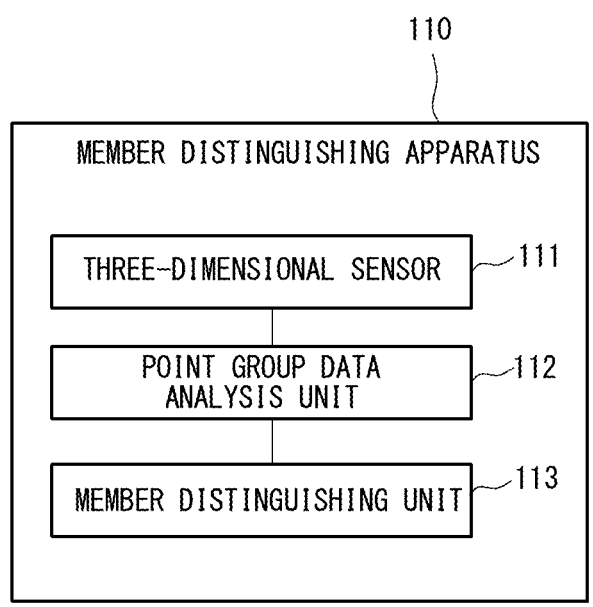
FIG. 2 is a block diagram showing a configuration of a member distinguishing apparatus according to a second example embodiment.

First, a configuration example of a member distinguishing apparatus according to the second example embodiment will be described. FIG. 2 is a block diagram showing a configuration of a member distinguishing apparatus 110 according to the second example embodiment. As shown in FIG. 2, the member distinguishing apparatus 110 includes a three-dimensional sensor 111, a point group data analysis unit 112, and a member distinguishing unit 113.

The three-dimensional sensor 111 can measure a distance based on at least amplitude information of light, and irradiates one or more members to be inspected with a beam to acquire first point group data. The three-dimensional sensor 111 is, for example, a 3D-LiDAR (Light Detection and Ranging) sensor.

Figure 3:
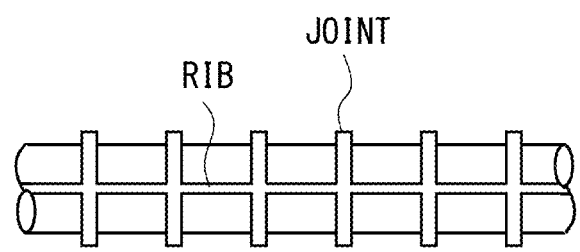
FIG. 3 is a schematic view showing an outer shape of a deformed steel bar which is a reinforcing bar serving as a member to be inspected by the member distinguishing apparatus according to the second example embodiment.

Here, the members to be inspected are reinforcing bars called deformed steel bars (also called deformed reinforcing bars). FIG. 3 is a schematic view showing an outer shape of one of the deformed steel bars. As shown in FIG. 3, the deformed steel bar is provided with uneven projections called "ribs" and "knots" on its surface. Standard names such as "D10", "D13", "D16", and "D19" are given to the deformed steel bars depending on their respective diameters. The numbers in the standard names indicate approximate diameters of the deformed steel bars, for example, the diameter of D10 is 9.53 mm and the diameter of D13 is 12.7 mm. That is, the diameters of the deformed steel bars are standardized at intervals of 2 to 3 mm.

Referring again to FIG. 2, the point group data analysis unit 112 extracts the second point group data, which is the point group data of the member to be inspected, from the first point group data. The point group data analysis unit 112 obtains the distribution of the point group data, which is the second point group data, of the member to be inspected in each of the vertical direction, the lateral direction, and the depth direction. The distribution here is a variance. The definitions of the vertical, lateral, and depth directions of the member to be inspected will be described later. The member distinguishing unit 113 distinguishes the type of the member to be inspected from the distribution of the point group data in each of the vertical direction, the lateral direction, and the depth direction of the member to be inspected obtained by the point group data analysis unit 112.

Figure 4:
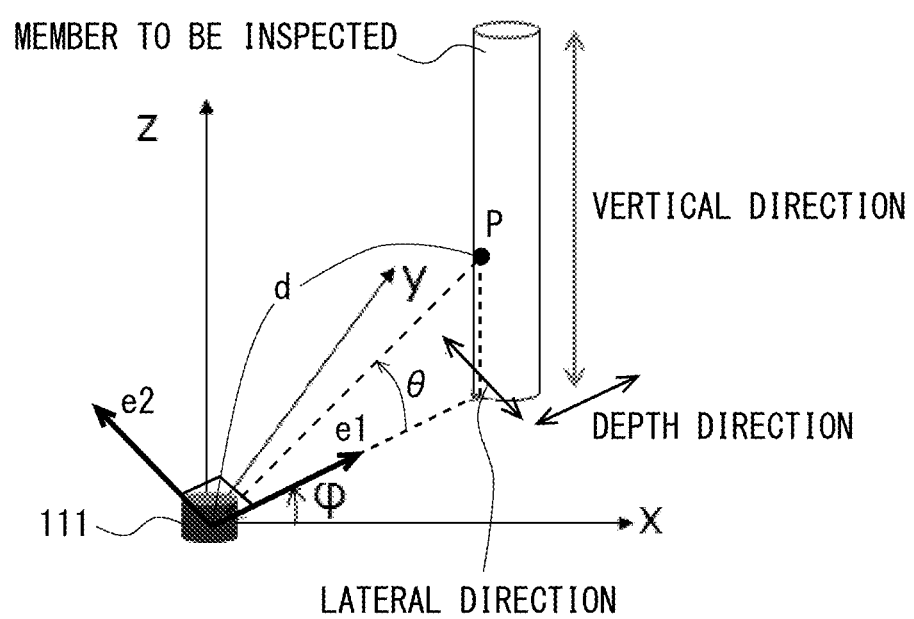
FIG. 4 is a schematic view for explaining definitions of directions of the member to be inspected.

FIG. 4 is a schematic view for explaining the definitions of the directions of the member to be inspected. As shown in FIG. 4, the reference three-dimensional orthogonal coordinate system has an origin at the position of the three-dimensional sensor 111 and is composed of an x-axis as a first axis, a y-axis as a second axis, and a z-axis as a third axis. The reference three-dimensional orthogonal coordinate system is set, for example, in such a way that the z-axis as the third axis is vertical, and a plane including the x-axis as the first axis and the y-axis as the second axis is horizontal.

The reference three-dimensional orthogonal coordinate system can be transformed into a reference three-dimensional polar coordinate system having an origin at the position of the three-dimensional sensor 111. It is assumed that a point P is a representative point of a part of the member to be inspected which is irradiated with the beam emitted from the three-dimensional sensor 111. The point P is expressed as (x, y, z) in the three-dimensional orthogonal coordinate system and as (d, φ, θ) in the three-dimensional polar coordinate system. Here, d is a distance from the origin to the point P, i.e., a moving radius. φ is an angle formed by a projection of a radial vector (a vector from the origin to the point P) onto the x-axis and the xy plane. θ is an angle formed by the xy plane and the radial vector. The relations of x=d·cos θ·cos φ, x=d·cos θ·sin φ, and z=d·sin θ hold. Note that the representative point where the beam hits the member to be inspected is on an optical axis of the beam.

The vertical direction is the longitudinal direction of the member to be inspected. The lateral direction is a direction orthogonal to the irradiation direction of the beam when the area of the surface irradiated with the beam from the three-dimensional sensor 111 in the member to be inspected becomes the largest and also orthogonal to the vertical direction. The irradiation direction of the beam is a direction of an optical axis of the beam. The depth direction is a direction orthogonal to the vertical direction and the lateral direction. In the three-dimensional orthogonal coordinate system (x, y, z), the vertical direction is a direction parallel to the z-axis. In the three-dimensional orthogonal coordinate system (x, y, z), the lateral direction is a direction parallel to a vector e2 which is orthogonal, on the xy plane, to a direction vector e1 of projection of the beam emitted from the three-dimensional sensor 111 onto the xy plane. If the point P is a point of the member to be inspected where the beam emitted from the three-dimensional sensor 111 hits, the angle formed by the projection of the beam emitted from the three-dimensional sensor 111 onto the xy plane with the x-axis corresponds to an angle φ.

Next, a flow of processing for distinguishing the type of the member to be inspected in the member distinguishing unit 113 shown in FIG. 2 will be described. In the following description, FIG. 2 is also referred to as appropriate.

Figure 5:
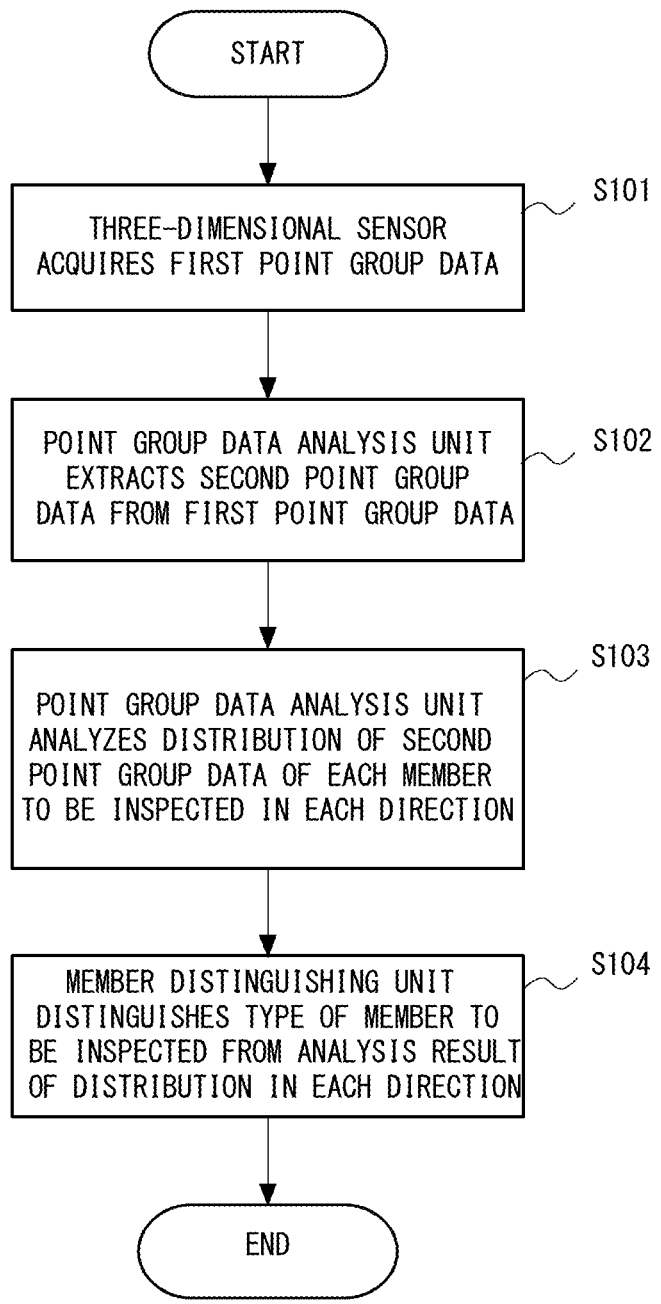
FIG. 5 is a flowchart for explaining a flow of processing for distinguishing a type of a member to be inspected by the member distinguishing apparatus according to the second example embodiment.

FIG. 5 is a flowchart for explaining a flow of processing for determining the type of the member to be inspected in the member distinguishing apparatus 110. As shown in FIG. 5, first, the three-dimensional sensor 111 emits a beam to one or more members to be inspected to acquire the first point group data (Step S101). That is, the three-dimensional sensor 111 emits a beam to a group of reinforcing bars placed at a construction site to acquire the first point group data.

Following Step 101, the point group data analysis unit 112 extracts second point group data, which is the point group data of each member to be inspected, from the first point group data (Step S102). That is, the second point group data, which is the point group data of the individual reinforcing bar, is extracted from the first point group data. Next, the point group data analysis unit 112 analyzes the distributions of the second point group data of each member to be inspected in the vertical direction, the lateral direction, and the depth direction (Step S103). Since the second point group data approximately represents the shape of the member to be inspected, the vertical, lateral, and depth directions of the second point group data correspond to the vertical, lateral, and depth directions of the member to be inspected described with reference to FIG. 4, respectively. Following Step S103, the member distinguishing unit 113 distinguishes the type of the member to be inspected from the analysis results of the distributions in the vertical direction, the lateral direction, and the depth direction (Step S104).

In Step S102 of FIG. 5, the second point group data is extracted by segmenting the first point group data by clustering. General-purpose clustering algorithms, such as Euclidean Clustering and Region Growing, may be used as the clustering. Euclidean clustering is an algorithm in which if an Euclidean distance between points is equal to or less than a threshold, the points belongs to the same cluster, whereas if the Euclidean distance between the points is greater than the threshold, the points belong to different clusters. In the Euclidean clustering, it is necessary to determine the threshold of the Euclidean distance between the points in advance. The region growing method is an algorithm in which if an orientation of a surface formed by a point and a surrounding point is within a threshold, the points belong to the same cluster, whereas if the orientation of the surface formed by the point and the surrounding point is greater than the threshold, the points belongs to different clusters. In the region growing method, it is necessary to determine in advance the threshold of the orientation of the surface, and it is also necessary to determine in advance how many surrounding points are included to calculate the orientation of the surface.

Figure 6:
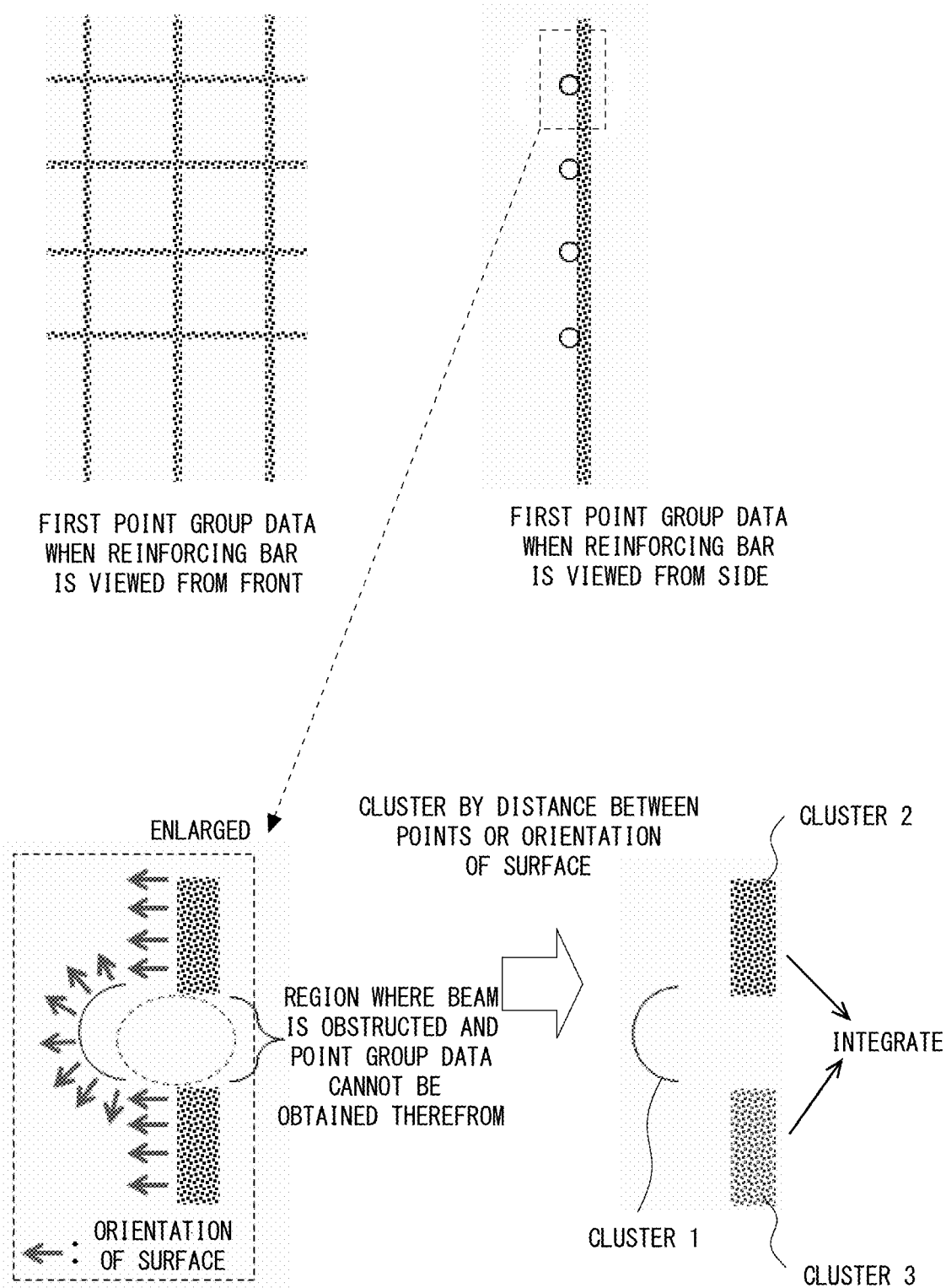
FIG. 6 is a schematic view for explaining a method of extracting second point group data, which is point group data of each member to be inspected, from first point group data.

FIG. 6 is a schematic view for explaining a method of extracting the second point group data, which is the point group data of each member to be inspected, from the first point group data. As shown in FIG. 6, in the first point group data, there is a region where the beam is obstructed and the point group data cannot be obtained therefrom. The first point group data is clustered by the distance between the points or the orientation of the surface. For example, the first point group data is segmented into clusters 1, 2, and 3 according to the distance between the points, because the distance between the points is far in the region where the point group data cannot be obtained since the beam is obstructed on the region. The two clusters, cluster 2 and cluster 3, are considered to be the same reinforcing bars, because the orientations of the surfaces are the same, the distances between the points are far, though. Therefore, the clusters 2 and 3 are integrated into one cluster based on the orientation of the surface, i.e., based on the coordinates of the center axis, the average of the coordinates in the depth direction and the horizontal direction, or the like. That is, the cluster obtained by integrating the cluster 2 and the cluster 3 is used as the second point group data. Further, since the orientation of the surface of the cluster 1 is different from that of the cluster 2 and that of the cluster 3, the cluster 1 alone is used as the second point group data. In this way, the second point group data, which is the point group data of each member to be inspected, is extracted.

Figure 7:
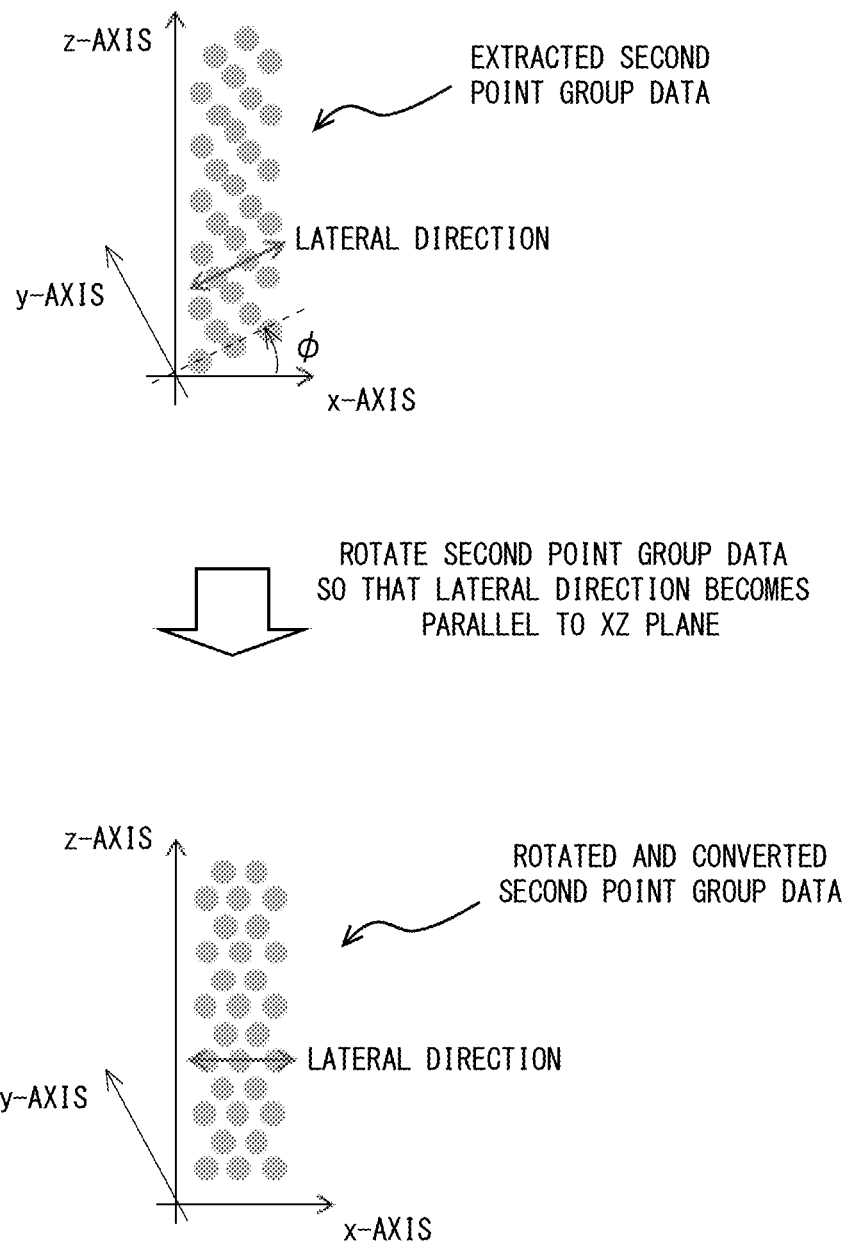
FIG. 7 is a schematic view for explaining a method of obtaining a distribution of the second point group data of each member to be inspected in a vertical direction, a lateral direction, and a depth direction in Step S103 of FIG. 5.

FIG. 7 is a schematic view for explaining a method of obtaining the distribution in each of the vertical direction, the lateral direction, and the depth direction of the second point group data of each member to be inspected in Step S103 of FIG. 5. As shown in FIG. 5, the second point group data and the lateral direction and the depth direction are rotationally converted based on the angle φ (see FIG. 3) formed by the x-axis (the first axis) and the projection of the radial vector on the xy plane (the plane including the first axis and the second axis) so that the lateral direction in the second point group data becomes parallel to the xz plane (the plane including the first axis and the third axis). After the rotation conversion, the variance of the second point group data in each of the vertical direction, the lateral direction, and the depth direction is obtained.

Figure 8:
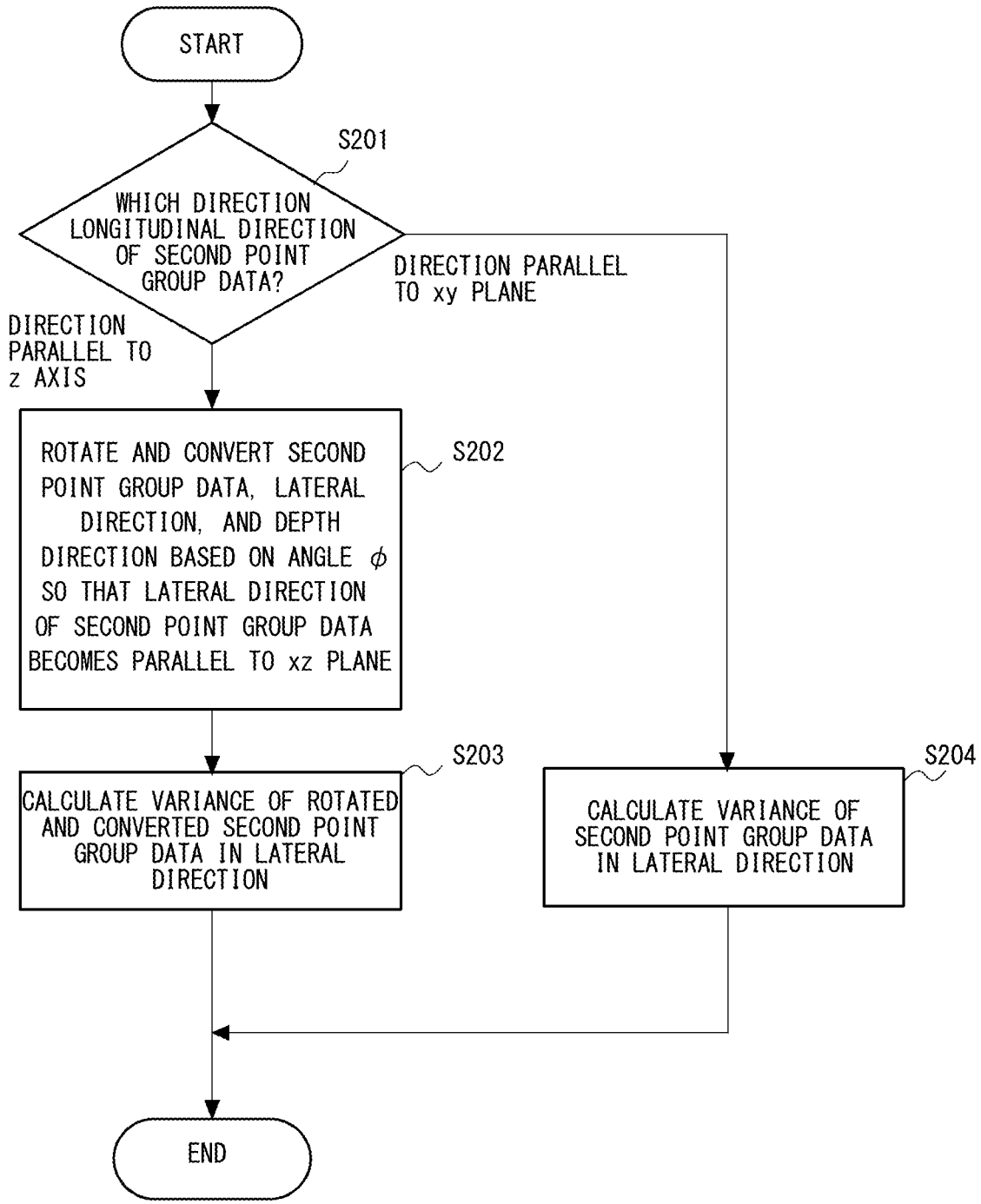
FIG. 8 is a flowchart showing a flow of processing for obtaining a distribution the second point group data of each member to be inspected in the vertical direction, the lateral direction, and the depth direction.

FIG. 8 is a flowchart showing a flow of processing for obtaining the variances as the distributions of the second point group data of each member to be inspected in the vertical direction, the lateral direction, and the depth direction. As shown in FIG. 8, it is determined whether the longitudinal direction of the second point group data is parallel to the xy plane (the plane including the first axis and the second axis) or parallel to the z-axis (the third axis) (Step S201). If it is determined in Step S201 that the longitudinal direction of the second point group data is parallel to the z-axis, the second point group data is rotated and converted based on the angle φ so that the lateral direction of the second point group data becomes parallel to the xz plane (the plane including the first axis and the third axis) (Step S202). After the rotation conversion, the variance of the second point group data in the lateral direction is calculated (Step S203). If it is determined in Step S201 that the longitudinal direction of the second point group data is parallel to the xy plane, the variance of the second point group data as it is in the lateral direction is calculated (Step S204).

According to the above-described method, when the longitudinal direction of the second point group data is parallel to the z-axis, the variances of the second point group data as the distributions in the vertical, lateral, and depth directions can be obtained.

In Step S103 of FIG. 5, the Principal Component Analysis (PCA) method can also be employed as the method of obtaining the distributions of the second point group data of each member to be inspected in the vertical direction, the lateral direction, and the depth direction. In the principal component analysis method, the eigenvalues of the principal components (eigenvectors) are the variances. In the PCA method, the principal components are referred to as a first principal component, a second principal component, and so forth in order of the eigenvalues. The first to third principal components can be obtained from the second point group data, because the second point group data is composed of three parameters (x, y, z).

Figure 9:
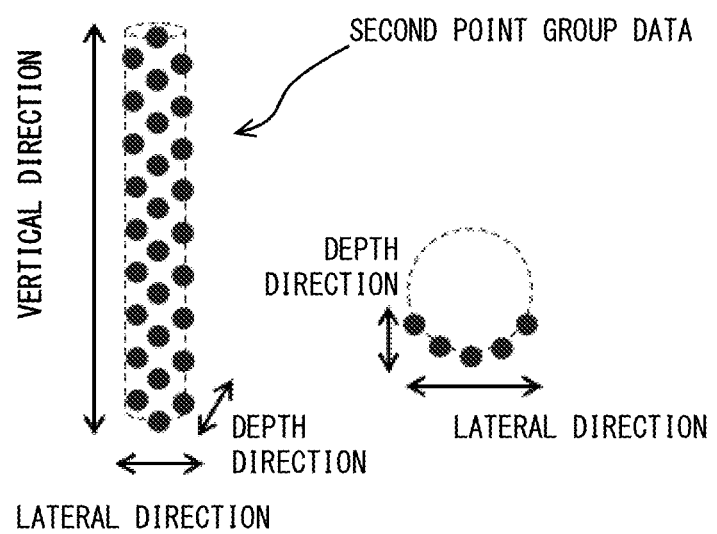
FIG. 9 is a schematic view for explaining a method of determining whether each of three principal components obtained in a principal component analysis method corresponds to the vertical direction, the lateral direction, or the depth direction.
Figure 10:
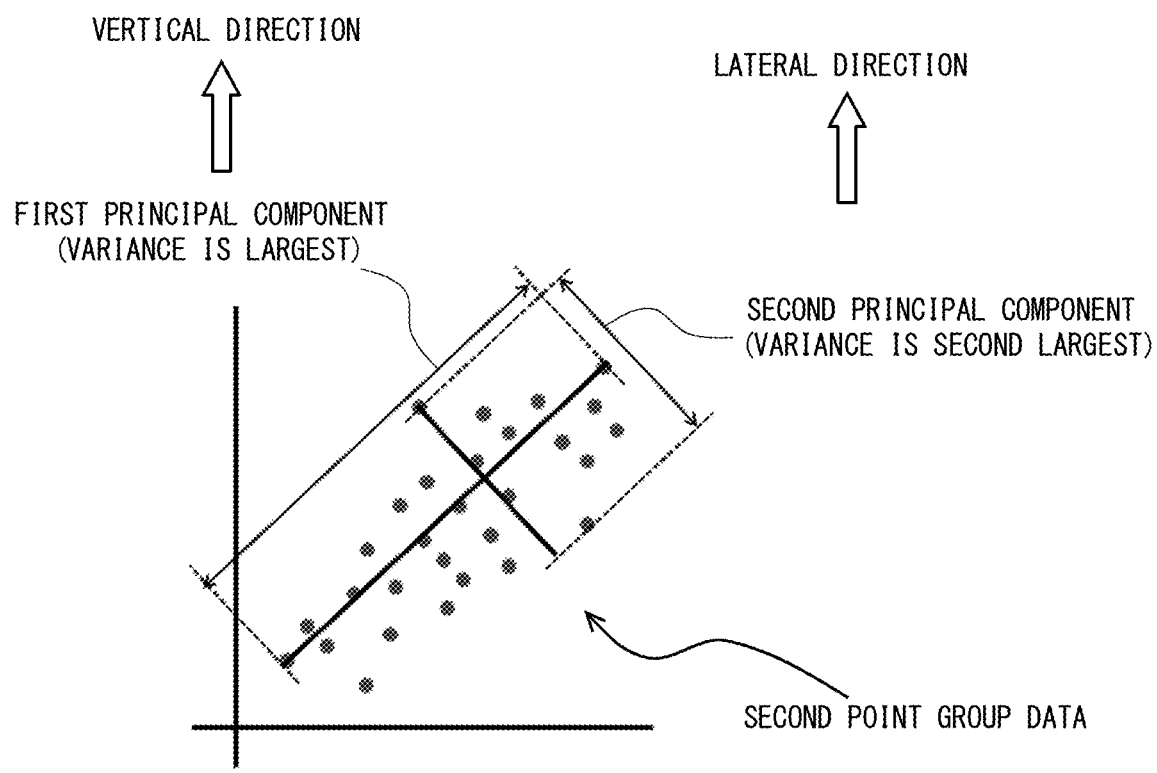
FIG. 10 is a schematic view for explaining a method of determining whether each of three principal components obtained in a principal component analysis method corresponds to the vertical direction, the lateral direction, or the depth direction.

In the PCA method, it is necessary to separately distinguish whether each of the obtained three principal components corresponds to the vertical direction, the lateral direction, or the depth direction. FIGS. 9 and 10 are schematic views for explaining a method of distinguishing whether each of the obtained three principal components corresponds to the vertical direction, the lateral direction, or the depth direction in the PCA method. As shown in FIG. 9, in the second point group data, the variance in the vertical direction becomes the largest. Further, since the point group data is present only on the surface facing the three-dimensional sensor 111, the variance in the lateral direction is larger than that in the depth direction. Therefore, as shown in FIG. 10, among the obtained principal components, it can be determined that the first principal component having the largest eigenvalue is in the vertical direction and the second principal component having the second largest eigenvalue is in the lateral direction.

Figure 11:
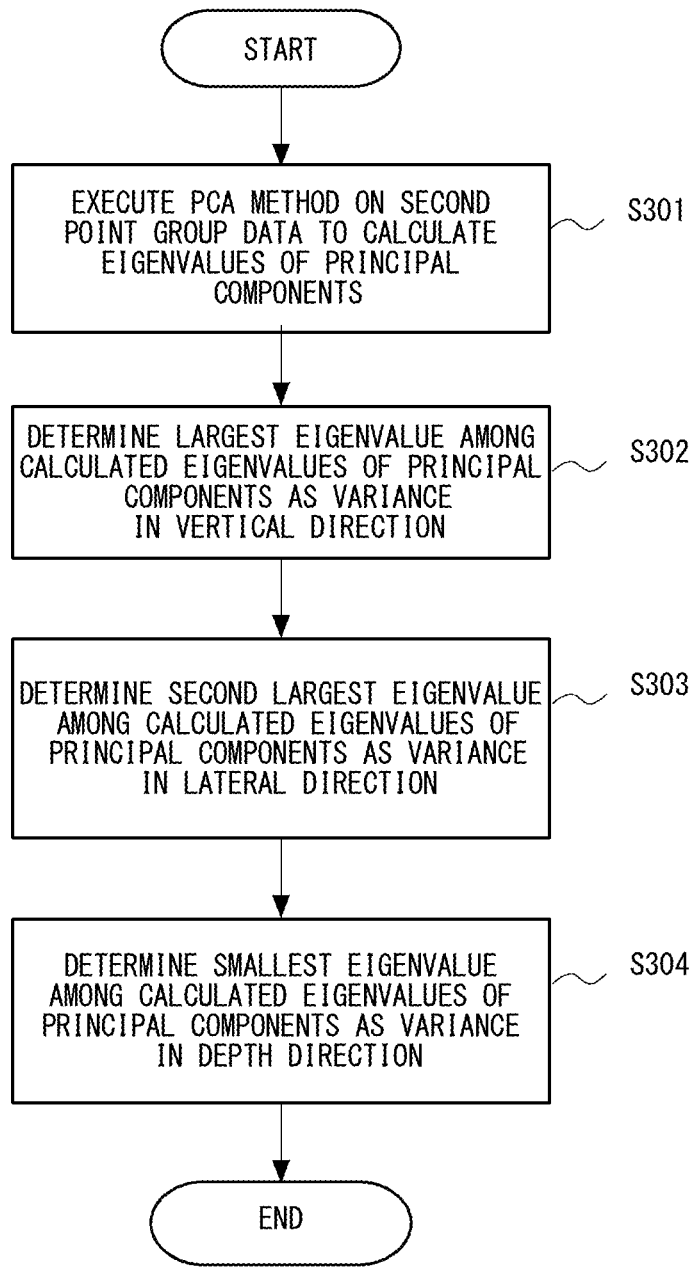
FIG. 11 is a flowchart showing a flow of processing for obtaining a variance of the second point group data in the vertical direction, the lateral direction, and the depth direction by the principal component analysis method.

FIG. 11 is a flowchart showing a flow of processing for obtaining the variances of the second point group data in the vertical direction, the lateral direction, and the depth direction by the PCA method. As shown in FIG. 11, the PCA method is executed on the second point group data to calculate the eigenvalues of the three principal components (Step S301). Next, the largest eigenvalue of the principal component among the eigenvalues obtained by the PCA method is determined as the variance in the vertical direction (Step S302). Next, the second largest eigenvalue of the principal component among the eigenvalues obtained by the PCA method is determined as the variance in the lateral direction (Step S303). Next, the smallest eigenvalue among eigenvalues of the three principal components is determined as the variance in the depth direction (Step S304).

In the PCA method, it is not necessary to rotate and convert the second point group data regardless of the longitudinal direction of the member to be inspected as the member to be inspected. That is, by using the PCA method, it is possible to easily obtain the distribution of the second point group data in each direction, even if the longitudinal direction of the reinforcing bar as the member to be inspected is an oblique direction which is neither a horizontal direction nor a vertical direction.

Figure 12:
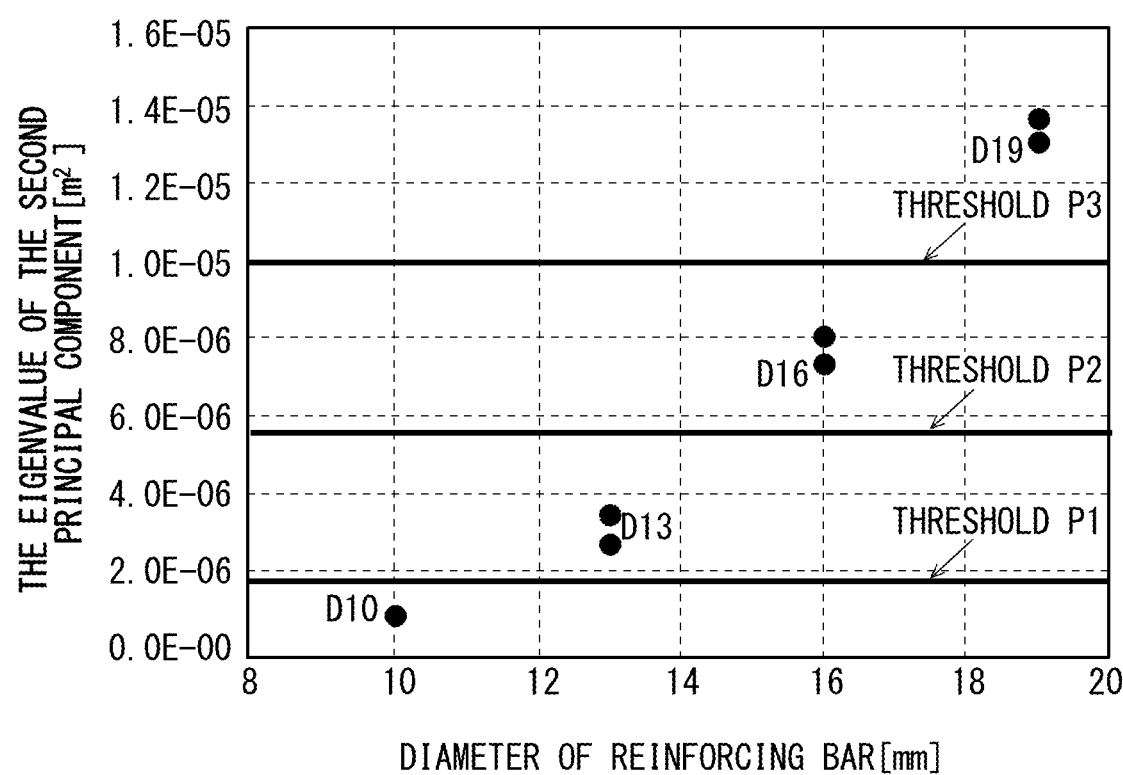
FIG. 12 is a graph showing a relationship between a diameter and an eigenvalue of a second principal component of a reinforcing bar to be inspected.

The eigenvalue of the second principal component corresponding to the variance in the lateral direction of the reinforcing bar as the member to be inspected correlates with the diameter of the reinforcing bar as the member to be inspected. FIG. 12 is a graph showing the relationship between the diameter and the eigenvalue of the second principal component in the reinforcing bar which is the member to be inspected. Here, the horizontal axis represents the diameter of the reinforcing bar [mm], and the vertical axis represents the eigenvalue of the second principal component [$m^2$]. As shown in FIG. 12, there is a clear difference between the ranges of eigenvalues of the second principal component according to the diameter of the reinforcing bar. Therefore, in Step S104 of FIG. 5, the member distinguishing unit 113 can distinguish the type of the reinforcing bar according to the range of the second main component obtained by analyzing the second point group data of the reinforcing bars (D10, D13, D16, and D19) as the member to be inspected using the PCA method. In FIG. 12, a threshold P1 is for distinguishing between D10 and D13. The threshold P2 is for distinguishing between D13 and D16. The threshold P3 is for distinguishing between D16 and D19. That is, it can be determined that if the second main component is within the range below the threshold P1, the reinforcing bar is D10, if the second main component is within the range from the threshold P1 or more and less than the threshold P2, the reinforcing bar is D13, if the second main component is within the range from the threshold P2 or more and less than the threshold P3, the reinforcing bar is D16, and if the second main component is within the range of the threshold P3 or more, the reinforcing bar is D19.

Next, an error of the variance in the lateral direction of the reinforcing bars as the member to be inspected will be described.

Figure 13:
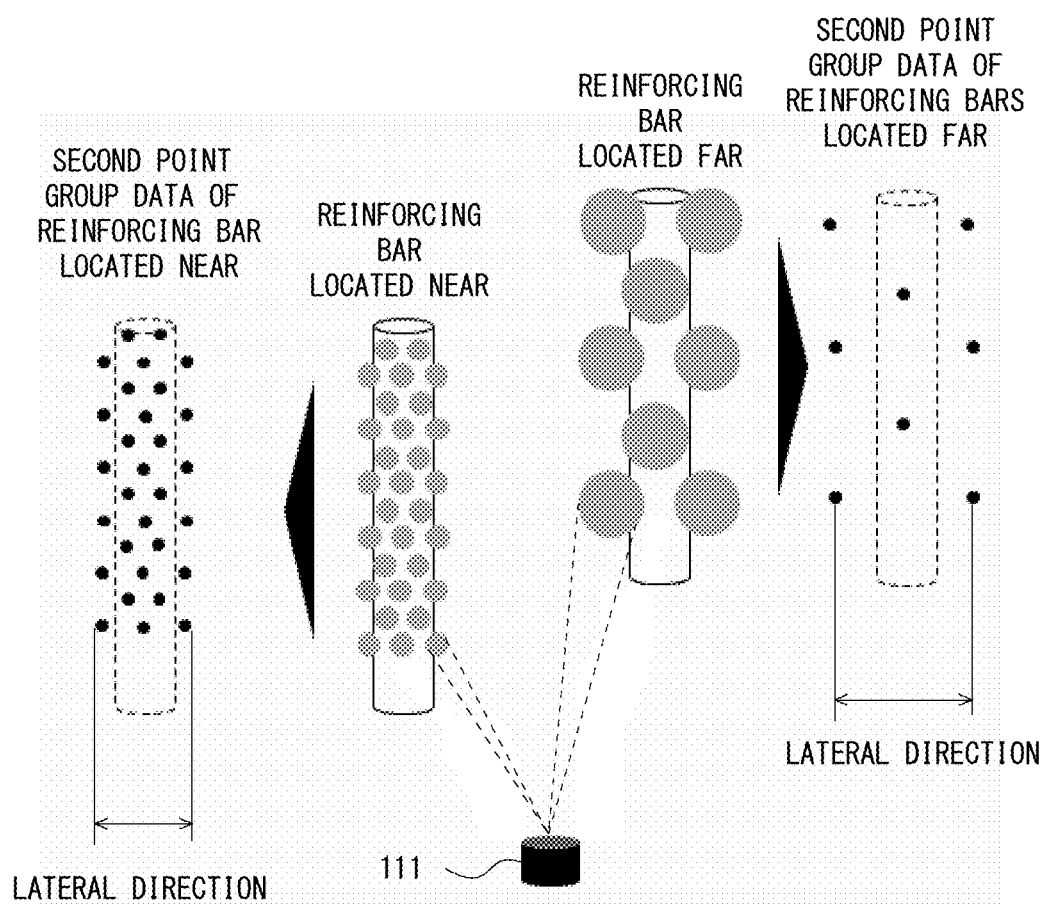
FIG. 13 is a schematic view for explaining errors in the variance of reinforcing bars as members to be inspected in the lateral direction.

FIG. 13 is a schematic view for explaining errors in the variances of the reinforcing bars in the lateral direction as members to be inspected. As shown in FIG. 13, the diameter of the beam emitted from the three-dimensional sensor 111 increases as the distance from the three-dimensional sensor 111 increases. In the three-dimensional sensor 111, even if a part of the beam hits the reinforcing bar, the point of the point group data may be obtained. Since the coordinate of the point acquired as the point group data is the coordinate of the center of the beam, the error of the variance of the second point group data in the lateral direction becomes larger for the reinforcing bars located farther from the three-dimensional sensor 111 than that for the reinforcing bars located near the three-dimensional sensor 111. In this way, the variance of the reinforcing bar in the lateral direction is affected by the distance between the reinforcing bar and the three-dimensional sensor 111. It is thus necessary to change the threshold of the range of the second main component for distinguishing the reinforcing bar described with reference to FIG. 12 according to the distance between the reinforcing bar and the three-dimensional sensor 111.

Next, the error of the variance of the reinforcing bar in the depth direction as the member to be inspected will be described.

Figure 14:
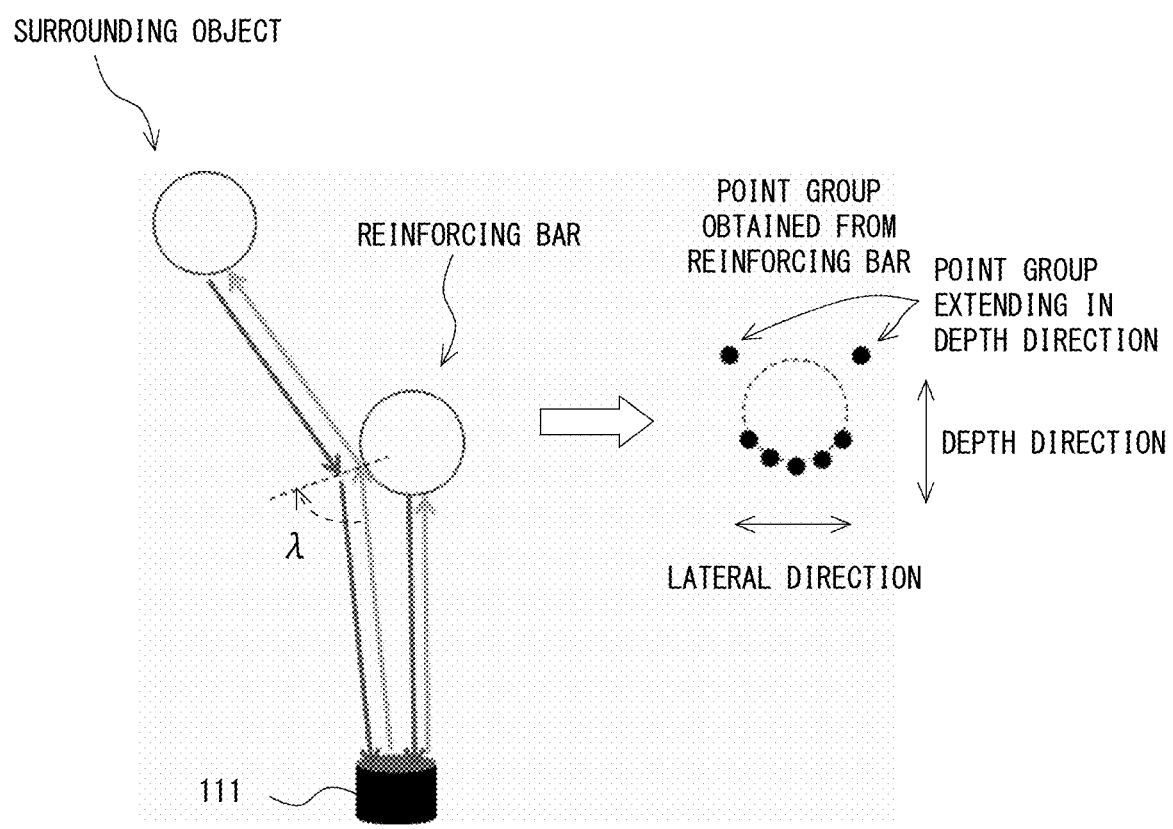
FIG. 14 is a schematic view for explaining errors in the variance of reinforcing bars as members to be inspected in the depth direction.

FIG. 14 is a schematic view for explaining an error in the variance of the reinforcing bar in the depth direction as the member to be inspected. As shown in FIG. 14, when an angle (an incident angle X) at which the beam emitted from the three-dimensional sensor 111 enters the reinforcing bar is large, the beam is totally reflected by the surface of the reinforcing bar. For this reason, the beam totally reflected by the surface of the reinforcing bar may hit a surrounding object, and the reflected light may return to the three-dimensional sensor 111. In such a case, a point group extending in the depth direction is obtained at both ends of the reinforcing bar in the lateral direction. Note that when the beam totally reflected by the surface of the reinforcing bar hits an object located at a considerable distance from the reinforcing bar and the reflected light returns to the three-dimensional sensor 111, there is no problem, because the point is determined as being present in an unrelated region by the clustering described above.

Figure 15:
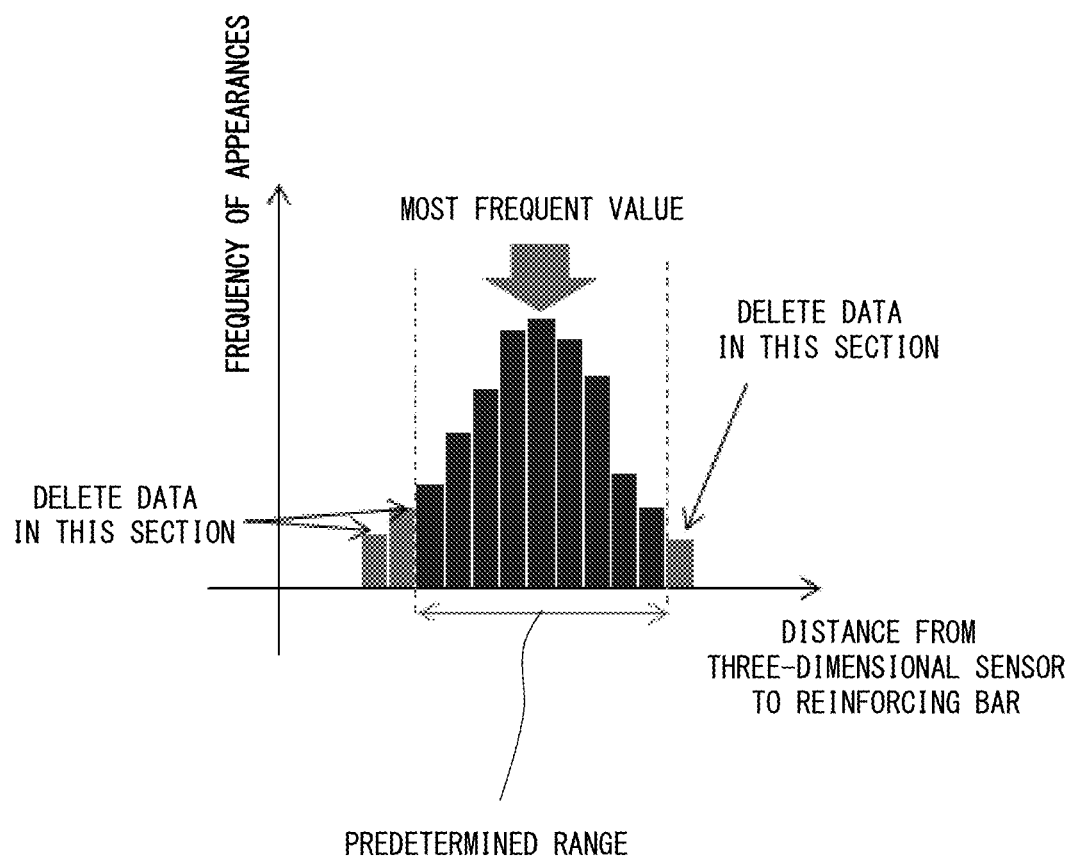
FIG. 15 is a schematic view for explaining a method of reducing the errors in the variance of reinforcing bars as members to be inspected in the depth direction.

FIG. 15 is a schematic view for explaining a method of reducing the error of the variance of the reinforcing bar as the member to be inspected in the depth direction. FIG. 15 is a frequency distribution graph showing a frequency of appearances of points of the reinforcing bar in the vertical direction with respect to the distance from the three-dimensional sensor 111 to the reinforcing bar. In FIG. 15, the horizontal axis represents the distance from the three-dimensional sensor 111 to the reinforcing bar, and the vertical axis represents the frequency of appearances of points of the reinforcing bar in the vertical direction. As shown in FIG. 15, data of points in a section of the frequency distribution graph outside a predetermined range based on a section of the most frequent value is deleted from the second point group data. The predetermined range is set based on the measurement error of the three-dimensional sensor 111.

Figure 16:
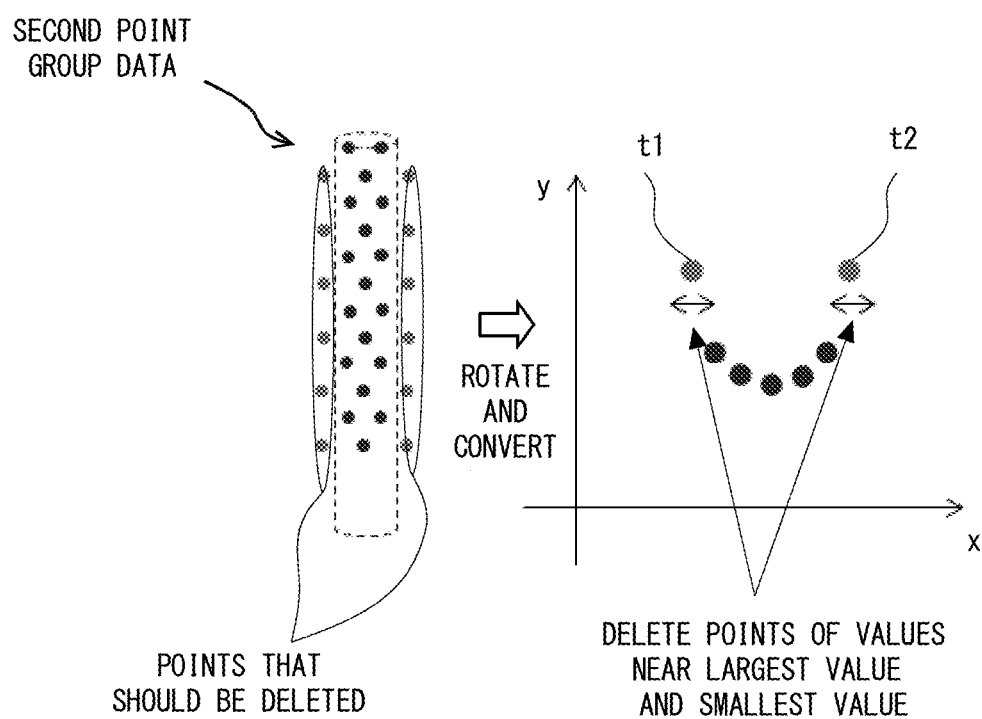
FIG. 16 is a schematic view for explaining another method of reducing the errors in the variance of reinforcing bars as members to be inspected in the depth direction.

FIG. 16 is a schematic view for explaining another method of reducing the error of the variance of the reinforcing bar as the member to be inspected in the depth direction. As shown in FIG. 16, first, the point group data of the reinforcing bar, which is the second point group data, is rotated and converted so that the lateral direction becomes parallel to the xz plane using the method described with reference to FIG. 7. Then, in the second point group data after the rotation conversion, a point group t1 having a smallest coordinate of the x-axis and a point group t2 having the largest coordinate are deleted.

FIG. 17 is a schematic view for explaining an error generated in the depth direction when the three-dimensional sensor 111 is a ToF (Time of Flight) type sensor which is a mainstream 3D-LiDAR sensor for automated driving. As shown in FIG. 17, when the three-dimensional sensor 111 is a ToF type sensor which is a mainstream 3D-LiDAR sensor for automated driving, measurement errors (on the order of cm), which are larger than the diameters of the reinforcing bars, are commonly generated in the measured values in the depth direction. Therefore, the coordinates in the depth direction are shifted back and forth by the error. This error may be corrected in the distribution of the second point group data in the depth direction.

Next, the processing of the member distinguishing unit 113 shown in FIG. 2 will be described in detail.

Figure 18:
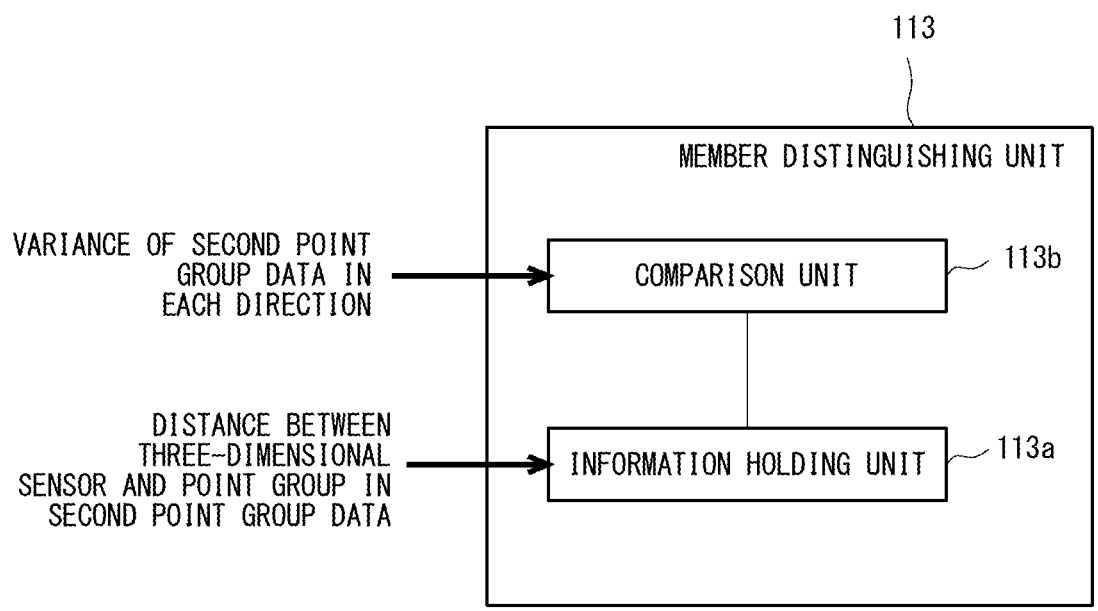
FIG. 18 is a block diagram showing a configuration of a member distinguishing unit.

FIG. 18 is a block diagram showing a configuration of the member distinguishing unit 113. As shown in FIG. 18, the member distinguishing unit 113 includes, as functional blocks, an information holding unit 113a and a comparison unit 113b.

The information holding unit 113a holds information about the type of the member to be inspected for each type of the member to be inspected. The information holding unit 113a holds reference information including information about the relationship between the distance from the three-dimensional sensor 111 to the member to be inspected and the range of values of the variances can take in a distinguishing direction. The distinguishing direction is a direction used for distinguishing the type of the member to be inspected, from among the vertical direction, the lateral direction, and the depth direction of the second point group data. The information holding unit 113a receives the variance of the second point group data in each direction. Note that when the variance of the second point group data is calculated by the PCA, the information holding unit 113a may hold information indicating which principal component is used to distinguish the type of the member to be inspected.

The comparison unit 113b distinguishes the type of the member to be inspected based on the reference information, the distance from the three-dimensional sensor 111 to the member to be inspected, and the variance of the second point group data in the distinguishing direction, and outputs information about the distinguished type of the member to be inspected. Note that the distance from the three-dimensional sensor 111 to the member to be inspected is obtained by the point group data analysis unit 112 based on the second point group data, and is input to the comparison unit 113b.

FIG. 19 is a schematic view showing an example of the reference information held in the information holding unit 113a (see FIG. 18). As shown in FIG. 19, the reference information is, for example, a table. In the table as the reference information, a range of a variance v in a direction for which the determination is made is shown for each type (with the standard names D10, D13, D16, and D19) of the reinforcing bar to be inspected at predetermined intervals from 1 m to 10 m of the distance from the three-dimensional sensor 111 to the reinforcing bar as the member to be inspected. Here, the direction for which the determination is made is the lateral direction of the second point group data. Further, the predetermined interval is appropriately set to, for example, a 1 m interval or a 5 m interval according to the specification of the three-dimensional sensor 111, the type of the member to be inspected, etc. For example, assume that the distance from the three-dimensional sensor 111 to the reinforcing bar is 1 m, and the variance v of the second point group data of the reinforcing bar in the distinguishing direction is 3.0 E-06 $m^2$. In the reference information, the variance v of the second point group data of the reinforcing bar in the distinguishing direction falls within the range of 1.8 E-06 $m^2 \leq v < 5.8$ E-06 $m^2$, where the distance from the three-dimensional sensor 111 to the reinforcing bar is 1 m. Therefore, the comparison unit 113b (see FIG. 18) distinguishes that the reinforcing bar is "D13".

Modified Example 1

Figure 20:
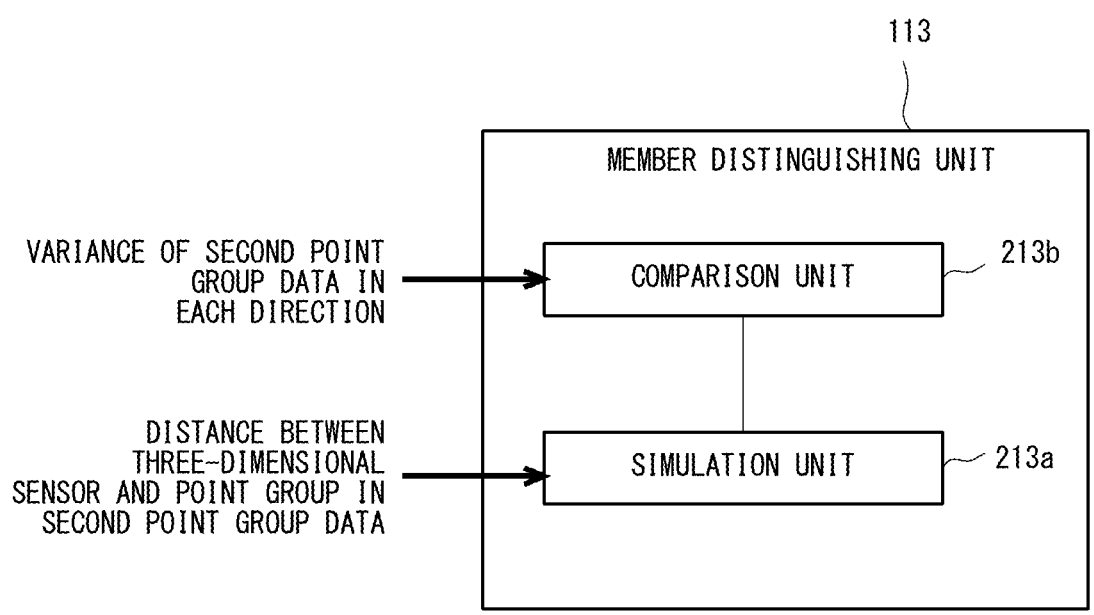
FIG. 20 is a block diagram showing the configuration of the member distinguishing unit according to the first modified example.

FIG. 20 is a block diagram showing a configuration of the member distinguishing unit 113 according to a modified example 1, i.e., a configuration different from that shown in FIG. 18. As shown in FIG. 20, the member distinguishing unit 113 includes, as functional blocks, a simulation unit 213a and a comparison unit 213b.

The distance between the three-dimensional sensor 111 and a point group in the second point group data is input to the simulation unit 213a. The simulation unit 213a generates, for each type of member to be inspected, third point group data that is assumed to be obtained by measurement based on the distance from the three-dimensional sensor 111 to the member to be inspected, information about the specification of the three-dimensional sensor 111, and information about a shape of the member to be inspected. Then, the simulation unit 213a obtains the variance of the generated third point group data in the lateral direction.

The comparison unit 213b receives the variance of the second point group data in each direction. The comparison unit 213b compares the variance of the second point group data in the lateral direction with the variance of the third point group data in the lateral direction for each type of the member to be inspected corresponding to the distance from the three-dimensional sensor 111 to the member to be inspected obtained based on the second point group data. Then, the comparison unit 213b outputs information about the type of the member to be inspected corresponding to the third point group data whose variance has the smallest difference from the variance of the second point group data.

Figure 21:
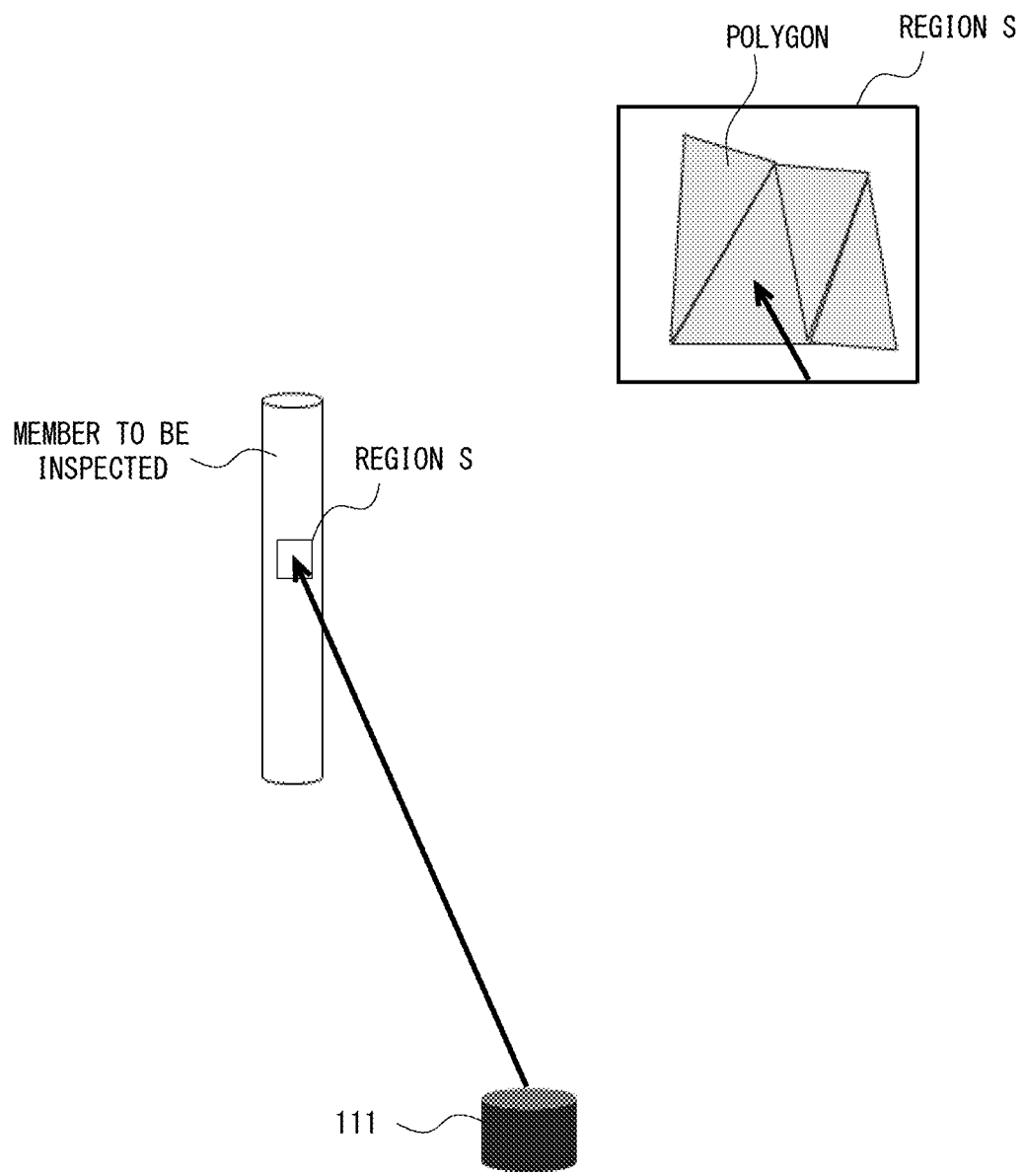
FIG. 21 is a schematic view showing a method of generating third point group data in the simulation unit.

FIG. 21 is a schematic view showing a method of generating the third point group data in the simulation unit 213a (see FIG. 20). As shown in FIG. 21, it is determined whether or not an intersection with the beam emitted from the three-dimensional sensor 111 is present within the range of a polygon for each polygon constituting the CAD drawing in which the member to be inspected is drawn. When it is determined that the intersection with the beam is within the range of the polygon, the intersection is defined as a point included in the third point group data. In this way, the simulation unit 213a virtually scans the member to be inspected by changing the irradiation direction of the beam in accordance with the specifications of the 3D-LiDAR to thereby generate the third point group data.

Figure 22:
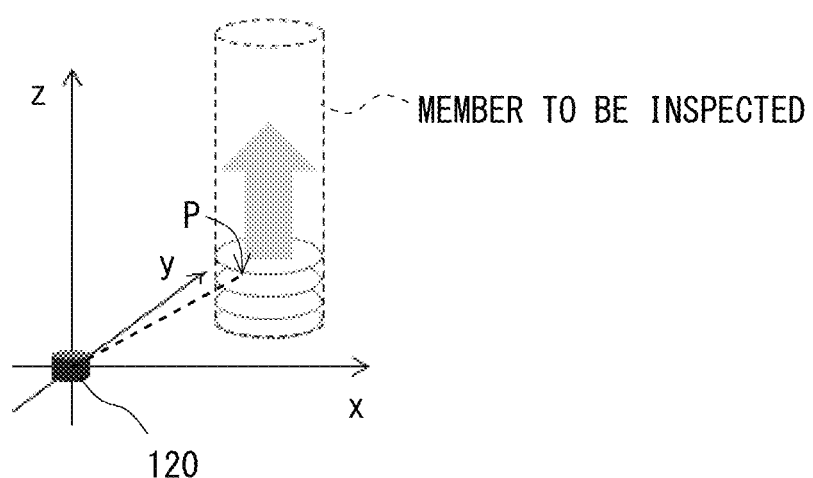
FIG. 22 is a schematic view for explaining another method of generating third point group data in the simulation unit.

FIG. 22 is a schematic view showing a method of generating the third point group data in the simulation unit 213a (see FIG. 20), which is different from the method described with reference to FIG. 21. As shown in FIG. 22, the member to be inspected is approximated to a simple shape which can be expressed by an equation, and the intersection of the shape and the beam emitted from the three-dimensional sensor 111 is stored as the point group data.

For example, when the member to be inspected is a reinforcing bar, the shape of the member to be inspected can be approximated as a cylinder.

Therefore, the equation of the member to be inspected is approximated by the following equation of the cylinder.

$$\text{Equation of cylinder: } (x-a)^2+(y-b)^2=1,\ m<z<n$$

In this equation, (a, b) is a center coordinate of the cylinder of the member to be inspected in the three-dimensional orthogonal coordinate system described with reference to FIG. 4. m is a z-coordinate of a bottom surface of the cylinder of the member to be inspected, and n is a z-coordinate of a top surface of the cylinder of the member to be inspected.

The point P (see FIG. 4) at which the beam emitted from the three-dimensional sensor 111 hits the member to be inspected is expressed as x=d·cos θ·cos φ, x=d·cos θ·sin φ, and z=d·sin θ, as described above. When these equations are substituted into the equation of the member to be inspected, a quadratic equation for d is obtained. If a solution exists to this quadratic equation, the coordinates (x, y, z) of the point P can be obtained. Note that when there are two intersections between the beam emitted from the three-dimensional sensor 111 and the member to be inspected, two solutions exist to the above-mentioned quadratic equation. In this case, the intersection on the side close to the three-dimensional sensor 111 is the point (the point P) where the beam hits the surface of the member to be inspected, and the intersection on the side far from the three-dimensional sensor 111 is a point where the beam is obstructed. Thus, the smaller one of the two solutions to the quadratic equation is referred to as d.

The simulation unit 213a shown in FIG. 20 may execute a simulation for each type of member to be inspected a plurality of times and generate the third point group data which is estimated point group data a plurality of times. In this case, the simulation unit 213a obtains a range of variations of the variances of the generated third point group data in the lateral direction, and obtains the range of the variance of the third point group data in the lateral direction for each type of the member to be inspected. The comparison unit 213b refers to the range of the variations of the third point group data for each type of the member to be inspected corresponding to the distance from the three-dimensional sensor 111 to the member to be inspected obtained based on the second point group data.

Then, the comparison unit 213b outputs information about the type of the member to be inspected corresponding to the third point group data in which the variations of the variances of the second point group data in the lateral direction is included in the range of the variations.

Next, results of the simulations performed by the simulation unit 213a on a plurality of different types of members to be inspected when the distances from the three-dimensional sensor 111 to the reinforcing bars are 5 m and 10 m, respectively, will be described.

Various conditions of the simulations are as follows.
1) The members to be inspected are four kinds of reinforcing bars (D10, D13, D16, and D19).
2) The three-dimensional sensor 111 is a 3D-LiDAR sensor with the following specifications.
   Horizontal angular resolution: 0.011°
   Vertical angular resolution: 0.1°
   Beam diameter at 0 m: 9.5 mm
   Beam spread angle: 3.0 mrad
   Ranging error: +/−3 cm (1σ, ranging error shall occur according to a normal distribution with a mean of 0 and a standard deviation of 3 cm.)
3) If even a part of the emitted beam hits the reinforcing bar, it is considered that the beam has hit the reinforcing bar.
4) The light reflected from the reinforcing bar shall return stochastically to the 3D-LiDAR according to the area hit by the beam. More specifically, if the ratio of the area where the beam has hit to the beam diameter (area where the beam has hit/beam diameter) is equal to or greater than a random number generated between 0.0 to 1.0, the reflected light returns to the 3D-LiDAR.
5) The shape of the reinforcing bar is cylindrical.
6) A simulation is executed 1000 times for each of the four kinds of reinforcing bars which are member to be inspected.

Figure 23:
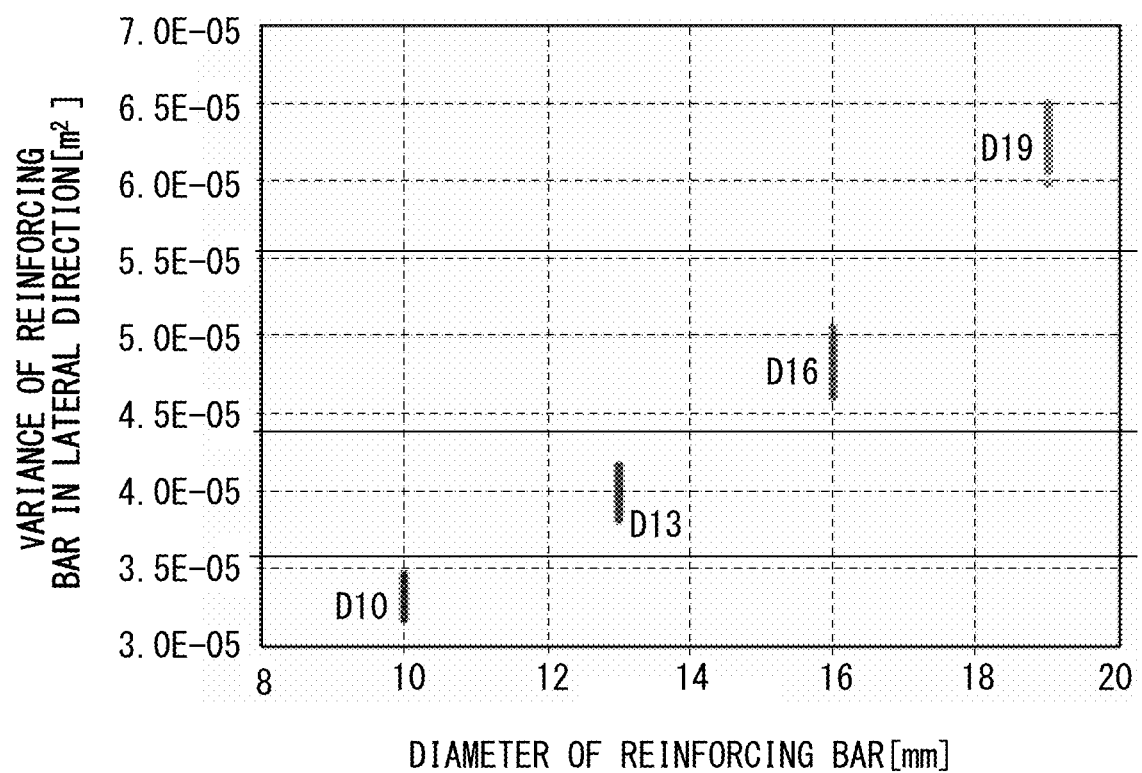
FIG. 23 is a graph in which variances in the lateral direction obtained by executing a simulating with a distance from the three-dimensional sensor to the reinforcing bar as 5 m are plotted.

FIG. 23 is a graph in which the variances in the lateral direction obtained by executing a simulation are plotted. In the simulation, the distance from the three-dimensional sensor 111 to the reinforcing bar is set to 5 m. In the graph, the horizontal axis represents the diameter of the reinforcing bar [mm], and the vertical axis represents the variance of the reinforcing bar in the lateral direction [m²]. As shown in FIG. 23, in each of the four types of reinforcing bars, the variances obtained by executing the simulation a plurality of times vary. The ranges of variations of the variances of D10, D13, D16, and D19 are different from each other. Therefore, the type of the measured reinforcing bar can be distinguished by determining where the variance of the second point group data in the lateral direction obtained by the measurement of the reinforcing bar by the three-dimensional sensor 111 is included in the ranges of the variations of the variances of the D10, D13, D16, and D19 obtained by the simulations.

Figure 24:
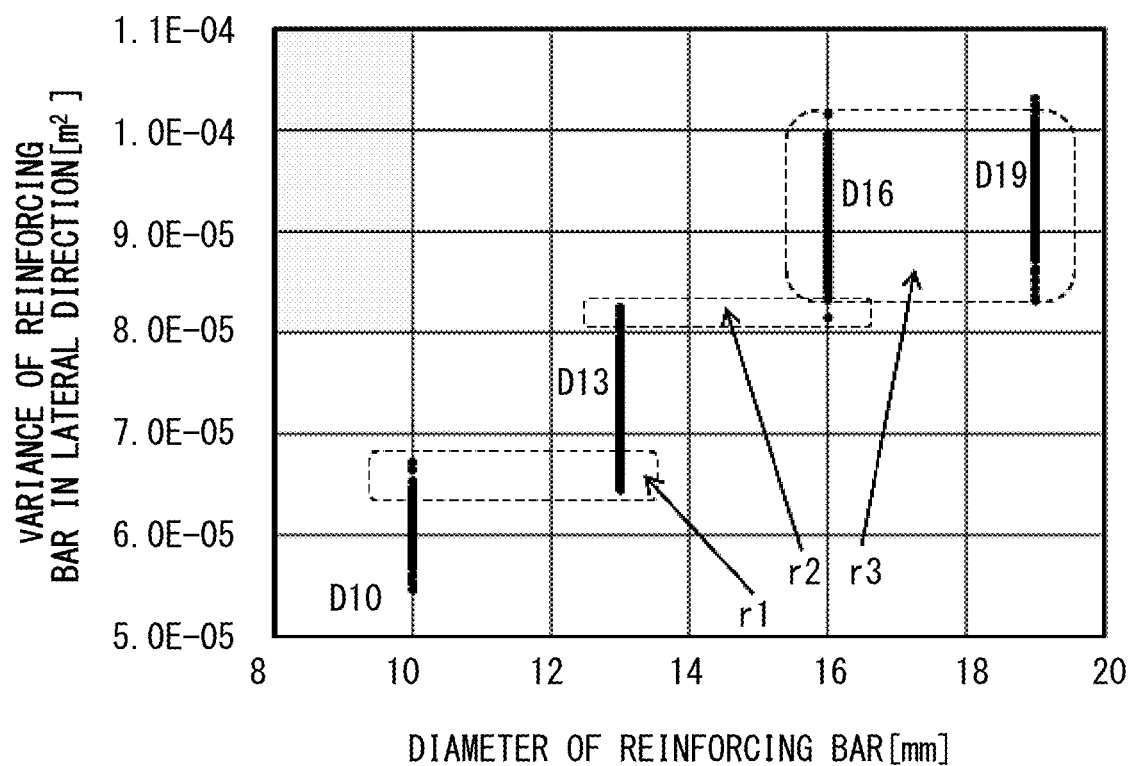
FIG. 24 is a graph in which variances obtained by executing a simulating with a distance from the three-dimensional sensor to the reinforcing bar as 5 m are plotted.

FIG. 24 is a graph in which the variances obtained by executing a simulation are plotted. In the simulation, the distance from the three-dimensional sensor 111 to the reinforcing bar is set to 10 m. In the graph, the horizontal axis represents the diameter of the reinforcing bar [mm], and the vertical axis represents the variance of the reinforcing bar in the lateral direction [m²]. As shown in FIG. 24, the ranges of the variations of the variances of the second point group data in the lateral direction overlap in a region r1 in D10 and D13, in a region r2 in D13 and D16, and in a region r3 in D16 and D19. That is, the variances of the second point group data in the lateral direction obtained by the measurement by the three-dimensional sensor 111 may be included in any of the regions r1, r2, and r3. Therefore, when the distance from the three-dimensional sensor 111 to the reinforcing bar is 10 m, the reinforcing bar is measured by the three-dimensional sensor 111 a plurality of times. Then, the type of the measured reinforcing bar is distinguished by the variations of the variances of the second point group data in the lateral direction obtained by the measurement.

As described above, the member distinguishing apparatus 110 according to this example embodiment automatically distinguishes the type of the member to be inspected using the distribution, in each direction, of the second point group data that is the point group data of the member to be inspected acquired by the three-dimensional sensor 111. By utilizing the distribution of the second point group data in each direction, the three-dimensional sensor 111 can distinguish the type of the member to be inspected even if the three-dimensional sensor 111 is an inexpensive sensor which cannot measure an accurate dimension of the member to be inspected. The degree of distinction precision of the inexpensive three-dimensional sensor 111 here is on the order of millimeters. Further, by automatically identifying the type of the member to be inspected, for example, when the member to be inspected is a reinforcing bar, the work load required for inspecting the reinforcing bar can be reduced.

Note that the members to be inspected to which the member distinguishing apparatus according to the above-described example embodiments can be applied are not limited to reinforcing bars, but include all members having similar shapes and different diameters such as reinforcing bars.

In the above example embodiments, the present disclosure has been described as a hardware configuration, but the present disclosure is not limited thereto. It is also possible to implement each processing by causing a CPU (Central Processing Unit) to execute a program.

The program for implementing the above processing can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure has been described with reference to the example embodiments, the present disclosure is not limited to the above. The configurations and details of the present disclosure can be modified in various ways that can be understood by those skilled in the art within the scope of the disclosure.

REFERENCE SIGNS LIST 10, 110 MEMBER DISTINGUISHING APPARATUS
11, 111 THREE-DIMENSIONAL SENSOR
12, 112 POINT GROUP DATA ANALYSIS UNIT
13, 113 MEMBER DISTINGUISHING UNIT
113a INFORMATION HOLDING UNIT
113b, 213b COMPARISON UNIT
213a SIMULATION UNIT

What is claimed is:

1. A member distinguishing apparatus comprising:
a three-dimensional sensor configured to irradiate one or more members to be inspected with a beam and acquire first point group data based on at least amplitude information of light;
a point group data analysis unit configured to extract second point group data from the first point group data, the second point group data being point group data of the member to be inspected, and obtain, with respect to the second point group data, a distribution of the point group data in a vertical direction, the vertical direction being a longitudinal direction of the member to be inspected, a lateral direction orthogonal to an irradiation direction of the beam when an area of a surface of the member to be inspected irradiated by the three-dimensional sensor becomes the largest and also orthogonal to the vertical direction, and a depth direction orthogonal to the longitudinal direction and the lateral direction; and
a member distinguishing unit configured to distinguish a type of the member to be inspected from the distribution, wherein
the point group data analysis unit is configured to, in a reference three-dimensional orthogonal coordinate system composed of a first axis, a second axis, and a third axis and configured in such a way that the vertical direction is parallel to the third axis and the lateral direction is along a plane including the first axis and the second axis, rotate and convert the second point group data, the lateral direction, and the depth direction based on an angle formed by a direction, in which the irradiation direction of the beam is projected onto the plane including the first axis and the second axis, and the first axis so that the lateral direction becomes parallel to a plane including the first axis and the third axis and obtain the distribution of the second point group in each of the vertical direction, the lateral direction, and the depth direction.

2. The member distinguishing apparatus according to claim 1, wherein the distribution is a variance.

3. The member distinguishing apparatus according to claim 2, wherein
the point group data analysis unit is configured to obtain the variance of the second point group data in each of the vertical direction, the lateral direction, and the depth direction by a method of a principal component analysis.

4. The member distinguishing apparatus according to claim 2, wherein
the point group data analysis unit is configured to obtain a distance from the three-dimensional sensor to the member to be inspected based on the second point group data, and
the member distinguishing unit comprises:
an information holding unit configured to hold, for each type of member to be inspected, information about the type of the member to be inspected and reference information including information about a relationship between the distance from the three-dimensional sensor to the member to be inspected and a range of values the variance can take in a distinguishing direction, the distinguishing direction being used for distinguishing the type of the member to be inspected and being one of the vertical direction, the lateral direction, and the depth direction of the second point group data; and
a comparison unit configured to distinguish the type of the member to be inspected based on the reference information, the distance from the three-dimensional sensor to the member to be inspected, and the variance of the second point group data in the distinguishing direction, and output information related to the distinguished type of the member to be inspected.

5. The member distinguishing apparatus according to claim 2, wherein
the member distinguishing unit comprises:
a simulation unit configured to generate, for each type of member to be inspected, third point group data, the third point group data being estimated point group data, based on the distance from the three-dimensional sensor to the member to be inspected, information about a specification of the three-dimensional sensor, and information about a shape of the member to be inspected, and obtain the variance of the generated third point group data in the lateral direction;
a comparison unit configured to compare the variance of the second point group data in the lateral direction with the variance of the third point group data in the lateral direction of each type of the member to be inspected corresponding to the distance from the three-dimensional sensor to the member to be inspected obtained based on the second point group data, and output information about the type of the member to be inspected corresponding to the third point group data having the smallest difference from the variance of the second point group data.

6. The member distinguishing apparatus according to claim 2, wherein
the member distinguishing unit further comprises:
a simulation unit configured to generate, for each type of member to be inspected, third point group data a plurality of times, the third point group being estimated point group data, based on the distance from the three-dimensional sensor to the member to be inspected, information about a specification of the three-dimensional sensor, and information about a shape of the member to be inspected, and obtain the variance of the generated third point group data in the lateral direction and obtain, for each type of member to be inspected, a range of variations of the variances of the third point group data in the lateral direction; and
a comparison unit configured to refer to the range of the variations of the third point group data of each type of the member to be inspected corresponding to the distance from the three-dimensional sensor to the member to be inspected obtained based on the second pint point group data and output information about the type of the member to be inspected corresponding to the third point group data in which the variance of the second point group data in the lateral direction is included in the range of the variations.

7. The member distinguishing apparatus according to claim 4, wherein
the information holding unit is configured to hold information about which one of the vertical direction, the lateral direction, and the depth direction of the second point group data is the distinguishing direction.

8. The member distinguishing apparatus according to claim 1, wherein
the member to be inspected is a deformed steel bar.

9. A member distinguishing method comprising:
a first step of, performed by a three-dimensional sensor capable of acquiring point group data based on at least amplitude information of light, irradiating one or more members to be inspected with a beam and acquiring first point group data;

a second step of extracting second point group data from the first point group data, the second point group data being point group data of the member to be inspected, and obtaining, with respect to the second point group data, a distribution of the point group data in a vertical direction, the vertical direction being a longitudinal direction of the member to be inspected, a lateral direction orthogonal to an irradiation direction of the beam when an area of a surface of the member to be inspected irradiated by the three-dimensional sensor becomes the largest and also orthogonal to the vertical direction, and a depth direction orthogonal to the longitudinal direction and the lateral direction; and a third step of distinguishing a type of the member to be inspected from the distribution, wherein a point group data analysis unit is configured to, in a reference three-dimensional orthogonal coordinate system composed of a first axis, a second axis, and a third axis and configured in such a way that the vertical direction is parallel to the third axis and the lateral direction is along a plane including the first axis and the second axis, rotate and convert the second point group data, the lateral direction, and the depth direction based on an angle formed by a direction, in which the irradiation direction of the beam is projected onto the plane including the first axis and the second axis, and the first axis so that the lateral direction becomes parallel to a plane including the first axis and the third axis and obtain the distribution of the second point group in each of the vertical direction, the lateral direction, and the depth direction.

10. A non-transitory computer readable medium storing a program for causing a computer to execute:

a first step of, performed by a three-dimensional sensor capable of acquiring point group data based on at least amplitude information of light, irradiating one or more members to be inspected with a beam and acquiring first point group data;

a second step of extracting second point group data from the first point group data, the second point group data being point group data of the member to be inspected, and obtaining, with respect to the second point group data, a distribution of the point group data in a vertical direction, the vertical direction being a longitudinal direction of the member to be inspected, a lateral direction orthogonal to an irradiation direction of the beam when an area of a surface of the member to be inspected irradiated by the three-dimensional sensor becomes the largest and also orthogonal to the vertical direction, and a depth direction orthogonal to the longitudinal direction and the lateral direction; and a third step of distinguishing a type of the member to be inspected from the distribution, wherein a point group data analysis unit is configured to, in a reference three-dimensional orthogonal coordinate system composed of a first axis, a second axis, and a third axis and configured in such a way that the vertical direction is parallel to the third axis and the lateral direction is along a plane including the first axis and the second axis, rotate and convert the second point group data, the lateral direction, and the depth direction based on an angle formed by a direction, in which the irradiation direction of the beam is projected onto the plane including the first axis and the second axis, and the first axis so that the lateral direction becomes parallel to a plane including the first axis and the third axis and obtain the distribution of the second point group in each of the vertical direction, the lateral direction, and the depth direction.

* * * * *